United States Patent [19]
Schutze et al.

[11] 3,943,227
[45] Mar. 9, 1976

[54] POLYOLEFIN COMPOSITION AND USE OF SAME IN ALKALINE SOLUTIONS

[75] Inventors: Henry G. Schutze; Huler L. Wilder, Baytown, both of Tex.

[73] Assignee: Exxon Research & Engineering Co., Linden, N.J.

[22] Filed: Dec. 23, 1974

[21] Appl. No.: 535,318

Related U.S. Application Data
[62] Division of Ser. No. 278,143, Aug. 4, 1972.

[52] U.S. Cl. .............. 423/232; 423/220; 423/229
[51] Int. Cl.² ........................................ B01D 53/34
[58] Field of Search .......... 423/220, 210, 232, 228, 423/229, 226

[56] References Cited
UNITED STATES PATENTS

| | | | |
|---|---|---|---|
| 2,886,405 | 5/1959 | Benson et al. ................. | 423/232 X |
| 3,773,895 | 11/1973 | Thirkill ........................... | 423/232 X |
| 3,886,105 | 5/1975 | Schutze et al. ................. | 260/23 H |

*Primary Examiner*—Earl C. Thomas
*Attorney, Agent, or Firm*—T. B. McCulloch; David A. Roth

[57] ABSTRACT

Solid polyolefins of alpha monoolefins having 2 to 8 carbon atoms in the molecule such as, but not limited to, polyethylene and polypropylene containing a stearate radical such as calcium, zinc or magnesium stearate or stearic acid have added thereto an antifoaming amount of a barium compound which forms a water insoluble soap with the stearate radical in an alkaline solution.

9 Claims, 3 Drawing Figures

POLYOLEFIN COMPOSITION AND USE OF SAME IN ALKALINE SOLUTIONS

This is a division of application Ser. No. 278,143, filed 8/4/72.

BACKGROUND OF THE INVENTION

1. Field of the Invention

This invention is directed to solid polyolefin compositions containing a foaming agent which ordinarily forms foam in alkaline solution. More particularly, the invention is concerned with solid polypropylene containing a foaming agent and an antifoaming amount of a barium compound which reacts with or forms water insoluble soaps with the foaming agent. In its more specific aspects, the invention is directed to solid polyolefins containing a stearate radical and a barium compound which forms a water insoluble soap with the stearate radical.

2. Description of the Prior Art

It has been known heretofore to add fatty acids and fatty acid compounds to solid polymers of alpha monoolefins such as polyethylene and polypropylene. It has been known to add stearates and stearic acid to such polymers. Furthermore, it has been known to add barium compounds such as barium sulphate, barium oxide, and the like to plastics containing fatty acids. These filled polyolefins, however, were used as radiation shields and insulating materials.

It has not been known heretofore that stearates and/or stearic acid added to polymers of alpha monoolefins having 2 to 8 carbon atoms in the molecule when used as contacting means or packing rings and the like in alkaline solutions tend to form foam in the alkaline solution by the leaching out of the stearate radical or stearic acid by the alkaline solution with resultant foaming on using the alkaline solution to remove acid gases. In the present invention this problem is solved by including a barium compound in with the polyolefin in an amount sufficient to form a water insoluble soap with the leached stearate radical and thereby suppress the foaming. For example, the polypropylene packings rings for the aqueous alkaline solution such as hot potassium carbonate solution extraction and recovery of $CO_2$ and $H_2S$ extraction towers have given rise to an extreme foaming problem. The problem has been traced to the formation of surface active agents (primarily potassium stearate) in the carbonate solution. The stearate radical comes from the stearates (Na, K, Ca, Zn, Mg.) added to the polyolefin to serve as mold release and/or neutralizing agents. Glyceryl monostearate may sometimes be added to the resin. Stearic acid in resins such as polyolefins results from neutralization of acid residues in the resin or polyolefin. These soaps stabilize the foams generated as the $CO_2$ and $H_2S$ is regenerated from the alkaline solution by heating and the towers spill liquid over into the gas recovery system. Many salts capable of imparting hardness to water will suppress foaming. These include water soluble compounds of calcium, magnesium and barium. However, a basic form of these elements would not only serve to impart hardness to the carbonate solution but would also serve to reduce the availability of the stearate ion if present in the polymer itself. of these possibilities only barium hydroxide and barium oxide have the basic properties and water solubility characteristics to serve in this capacity. Thus, they are the preferred material to incorporate into polypropylene and the like used for the molding of packing rings and other articles of manufacture where foaming occurs due to carbonate solution.

Our invention is directed to the encapsulation of 0.01 to 1.0% of barium oxide or hydroxide or other barium components, which form water insoluble soaps, into the injection molding resin used to manufacture packing rings or other forms of plastic materials which are to function in basic lithium, sodium or potassium solutions or other alkaline solutions such as amines as illustrated by diethanol amine where foaming is a problem. Such encapsulated barium compounds may be introduced through a concentrated masterbatch dry blend technique or may be introduced as the pure pulverized or powdered or finely divided form of the basic compound directly into the resin.

The following prior art was considered in connection with this invention:

U.S. Patents 3,133,894
3,296,163
3,404,104

Foreign Patents

| | |
|---|---|
| German | 1,944,873 |
| German | 2,032,313 |
| French | 1,438,783 |
| German Appl. | 2,105,859 |
| Canadian | 599,694 |
| Canadian | 666,668 |

Literature Articles

The Oil and Gas Journal — Aug. 7, 1971, pp. 74–75
Hydrocarbon Processing, January 1972, pp. 115–118

None of the art, however, teaches the solution of a foaming problem by using barium compounds, which form antifoamants with the stearate radical, in solid polyolefin contacting means in alkaline solution removal of acid gases from hydrocarbon fluids and other gases.

SUMMARY OF THE INVENTION

The present invention may be briefly described and summarized as involving the encapsulation or admixing of a barium compound into injection molding resin such as a polymer of alpha monoolefin having 2 to 8 carbon atoms in the molecule, such as but not limited to polyethylene and polypropylene, which contains a stearate radical such as sodium, potassium, magnesium, calcium, or zinc stearate, stearic acid, or glyceryl monostearate, and the like. In the present invention, the polymer containing a barium compound which forms with the stearate radical a water insoluble soap suppresses foam when the resin is used in contact with aqueous alkaline solutions such as but not limited to solutions of compounds of the alkali metals such as lithium, sodium, or potassium, although amine or other alkaline solutions may be used such as diethanol amine. Potassium carbonate solution is useful for removal of acidic gases such as $CO_2$ and $H_2S$ under conditions well known in the art. The barium compound, preferably barium oxide or hydroxide, is used in amounts sufficient to react with the stearate radical and an amount of about 0.01% to about 1.0% may be encapsulated in the resin in the form of powder or in a finely divided form and then molded into contacting means such as packing rings, Berl saddles, gaskets, and the like, or into other articles with which the alkaline solution comes into contact.

BRIEF DESCRIPTION OF THE DRAWING

The present invention will be further illustrated by reference to the drawing in which.

DESCRIPTION OF THE PREFERRED EMBODIMENTS WITH REFERENCE TO THE DRAWING

Figure 1:
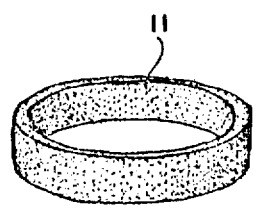
FIG. 1 represents a packing ring in accordance with the present invention.

Referring now to the drawing and particularly to FIG. 1, numeral 11 designates a packing ring which contains a farry acid radical such as a stearate radical such as zinc, calcium or magnesium stearate or stearic acid which is used or results from use as a mold release agent in forming the ring 11 from a solid polymer of an alpha monoolefin having 2 to 8 carbon atoms in the molecule, such as polyethylene or polypropylene. Suitably, the ring 11 is formed of solid polypropylene manufactured by the well-known Ziegler process. The packing ring 11 suitably contains a barium compound such as barium oxide, barium hydroxide, and the like, in an amount between about 0.01% and 1.0% by weight of the polypropylene sufficient to react with the stearate radical to form a water insoluble soap when both are leached from the ring 11 by the aqueous solution.

Figure 2:
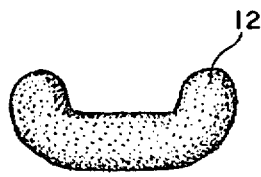
FIG. 2 is a showing of another contacting means.

Other packing means or contacting means may be employed such as saddles 12 (FIG. 2) or other forms also constructed of a polyolefin of the type described and which also contains a stearate radical and a barium compound as described.

The packing rings or means may be suitably used as a contacting means for removing acid gases from hydrocarbons. Particularly $H_2S$ and/or $CO_2$ and the like may be removed by contact with an alkaline solution as is well known in the art and under prior art conditions, which are incorporated by reference.

Figure 3:
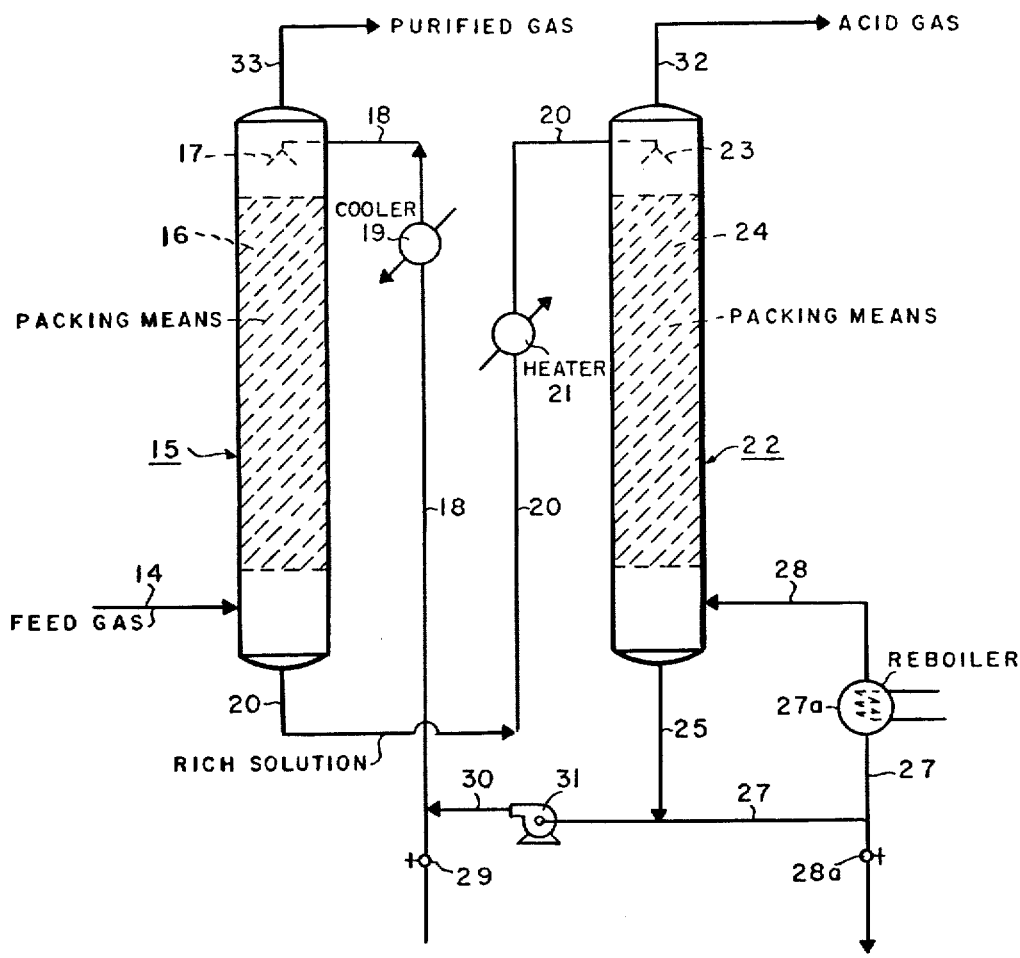
FIG. 3 illustrates the use of the packing ring in removing acid gas without foaming.

In reference to FIG. 3, a hydrocarbon feed gas containing $H_2S$ and/or $CO_2$ is introduced by line 14 into absorption zone 15 which is packed with contacting means such as 11 or 12 in a bed 16 where the ascending sour gas meets descending aqueous alkaline solution such as is well known; suitably the solution may be potassium carbonate introduced by spider 17 from line 18 containing a cooler 19.

The descending solution contacts the ascending gas or vapor and absorbs the sour gas which ordinarily is $H_2S$ or $CO_2$ or both of them with the rich solution discharging by line 20 containing a heater 21 into the top of a desorption zone comprised of tower 22 through spider 23 where it flows downwardly over bed 24 of packing means 11 or 12.

Heat is supplied to zone 22 by circulating stripped solution withdrawn by line 25 through a heating means such as reboiler 27a by lines 27 and 28 with provision being made for withdrawing a portion of the solution by opening valve 28a periodically. Likewise, fresh or make-up solution may be introduced by opening valve 29 in line 18. Branch line 30 containing pump 31 connecting to line 18 allows the lean or stripped solution to be pumped back to zone 15.

Acid gas is withdrawn by line 32 for disposal such as, when it is $H_2S$, by conversion to free S and, when $CO_2$, for reaction to form a carbonate or to form dry ice.

The purified gas recovered by line 33 from zone 15 may be used as a fuel when it is hydrocarbon or for chemical manufacture such as cracking to more valuable products.

In an operation such as described under the conditions employed for such processes, the aqueous alkaline solution leaches out at least a portion of the stearate or stearic acid employed as mold release agents used in forming the packing means and the barium compound. By including a sufficient amount of certain barium compounds, preferably barium oxie or hydroxide in the packing means, which ordinarily is constructed of solid polypropylene, the stearate ion is converted to water insoluble barium stearate which will precipitate out of the solution and may be filtered out of that portion of the solution, which is discharged from time to time, to prevent buildup in the system.

This prevents foaming difficulties which may be encountered usually in zone 22 but also may be encountered in zone 15. Foaming of the alkaline solution causes overflow of liquid and foam which makes the process inoperable. The present invention eliminates this problem and therefore is quite useful and advantageous.

The nature and objects of the present invention having been completely described and illustrated and the best mode contemplated set forth, what we wish to claim as new and useful and secure by Letters Patent is:

We claim:

1. In the process of separating weakly acidic gases selected from the group consisting of hydrogen sulfide, carbon dioxide and mixtures thereof from gaseous mixtures by contact with an aqueous potassium carbonate solution, the improvement comprising contacting said gaseous mixture with said carbonate solution in the presence of a contacting article comprising a solid polyolefin resin polymer of an alpha monoolefin having 2 to 8 carbon atoms in the molecule, having admixed therein a stearate radical unassociated with barium cation and an (antifoaming) amount of a (finely divided) water soluble barium compound (which forms) capable of forming sufficient water insoluble barium stearate soaps with said stearate radical after being (leaching) leached from said article by said alkaline solution and thus preventing (to prevent) foaming in said alkaline solution which would otherwise be caused by said stearate radicals unassociated with said barium cation.

2. A method in accordance with claim 1 in which the polymer is polypropylene, the stearate radical is zinc stearate, and the barium compound is barium hydroxide.

3. A method in accordance with claim 1 in which the gaseous mixture contains $H_2S$.

4. A method in accordance with claim 1 in which the gaseous mixture contains $CO_2$.

5. A method in accordance with claim 1 in which the gaseous mixture contains $H_2S$ and $CO_2$.

6. A method in accordance with claim 1 in which:
   a. the gaseous mixture is a hydrocarbon gas containing hydrogen sulfide and/or carbon dioxide;
   b. the solid polymer is polypropylene;
   c. the stearate radical is zinc stearate; and d. the barium compound is barium hydroxide in an amount from about 0.01 to about 1.0% by weight of the polymer.

7. A method in accordance with claim 1 wherein said barium compound is barium hydroxide.

8. A method according to claim 1 wherein said barium compound is barium oxide.

9. A process according to claim 1 wherein said barium compound is in finely divided form.

* * * * *

UNITED STATES PATENT OFFICE
CERTIFICATE OF CORRECTION

Patent No. 3,943,227　　　　　　　　　　Dated　 March 9, 1976

Inventor(s) Henry G. Schutze and Hulen L. Wilder

It is certified that error appears in the above-identified patent and that said Letters Patent are hereby corrected as shown below:

All of the material which appears in parentheses in Claim 1 was intended to have been DELETED from the claim by amendment, so that Claim 1 properly reads:

1. In the process of separating weakly acidic gases selected from the group consisting of hydrogen sulfide, carbon dioxide and mixtures thereof from gaseous mixtures by contact with an aqueous potassium carbonate solution, the improvement comprising contacting said gaseous mixture with said carbonate solution in the presence of a contacting article comprising a solid polyolefin resin polymer of an alpha monoolefin having 2 to 8 carbon atoms in the molecule, having admixed therein a stearate radical unassociated with barium cation and an amount of a water soluble barium compound capable of forming sufficient water insoluble barium stearate soaps with said stearate radical after being leached from said article by said alkaline solution and thus preventing foaming in said alkaline solution which would otherwise be caused by said stearate radicals unassociated with said barium cation.

Signed and Sealed this

Twenty-fifth Day of October 1977

[SEAL]

Attest:

RUTH C. MASON　　　　　　LUTRELLE F. PARKER
Attesting Officer　　　Acting Commissioner of Patents and Trademarks